United States Patent [19]

Ezawa

[11] Patent Number: 5,456,419
[45] Date of Patent: Oct. 10, 1995

[54] FILM FEEDER FOR CAMERAS

[75] Inventor: Akira Ezawa, Tokyo, Japan

[73] Assignee: Nikon Corporation, Tokyo, Japan

[21] Appl. No.: 370,361

[22] Filed: Jan. 9, 1995

Related U.S. Application Data

[63] Continuation of Ser. No. 226,120, Apr. 11, 1994, abandoned, which is a continuation of Ser. No. 133,797, Oct. 8, 1993, abandoned, which is a continuation of Ser. No. 678,216, Apr. 1, 1991, abandoned.

[30] Foreign Application Priority Data

Apr. 2, 1990 [JP] Japan ................................ 2-87864

[51] Int. Cl.$^6$ .................................................. G03B 1/12
[52] U.S. Cl. ...................... 242/356; 354/173.1; 354/214
[58] Field of Search ........................... 242/71.6, 71.4, 242/71, 71.5, 356, 356.2, 356.3, 356.4; 354/173.1, 214

[56] References Cited

U.S. PATENT DOCUMENTS

| | | | |
|---|---|---|---|
| 4,482,226 | 11/1984 | Tamamura | 242/356 X |
| 4,589,604 | 5/1986 | Yagi et al. | 242/356 |
| 4,832,275 | 5/1989 | Robertson | 242/348.3 |
| 4,834,306 | 5/1989 | Robertson et al. | 242/348.3 |
| 5,160,953 | 11/1992 | Iwashita et al. | 354/173.1 |

FOREIGN PATENT DOCUMENTS 1-25938  8/1989  Japan.

Primary Examiner—John M. Jillions
Attorney, Agent, or Firm—Shapiro and Shapiro

[57] ABSTRACT

A film feeder for cameras comprises a drive shaft for driving a film cartridge which is engaged with a spool shaft of the film cartridge to rotationally drive the spool in the forward direction or the reverse direction, thereby rotationally driving the spool in the film lead-out direction or in the film rewinding direction, respectively; an electric motor for rotationally driving the foregoing drive shaft and capable of rotating forwardly or reversely; a rotation transmission system for transmitting a rotational force derived from the motor; and a switch device for selecting either of two transmission paths for driving the drive shaft of the cartridge in compliance with the rotational direction imparted by the motor.

10 Claims, 1 Drawing Sheet

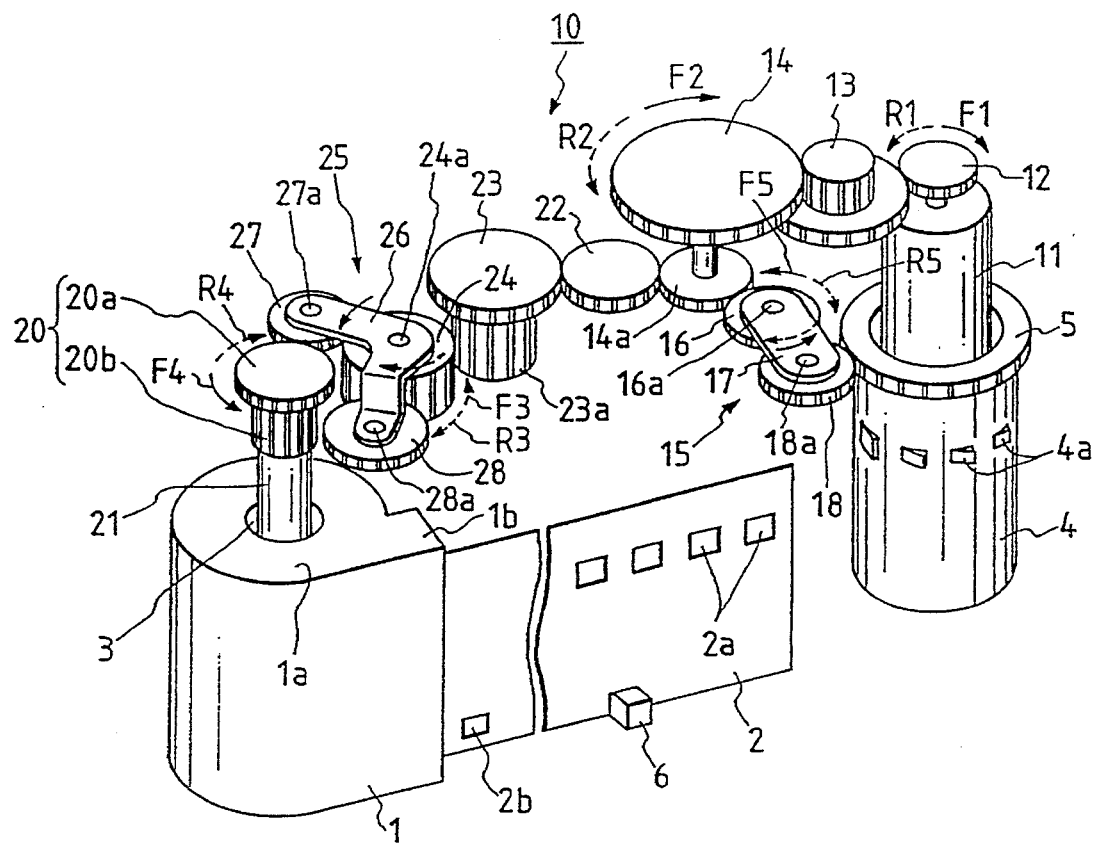
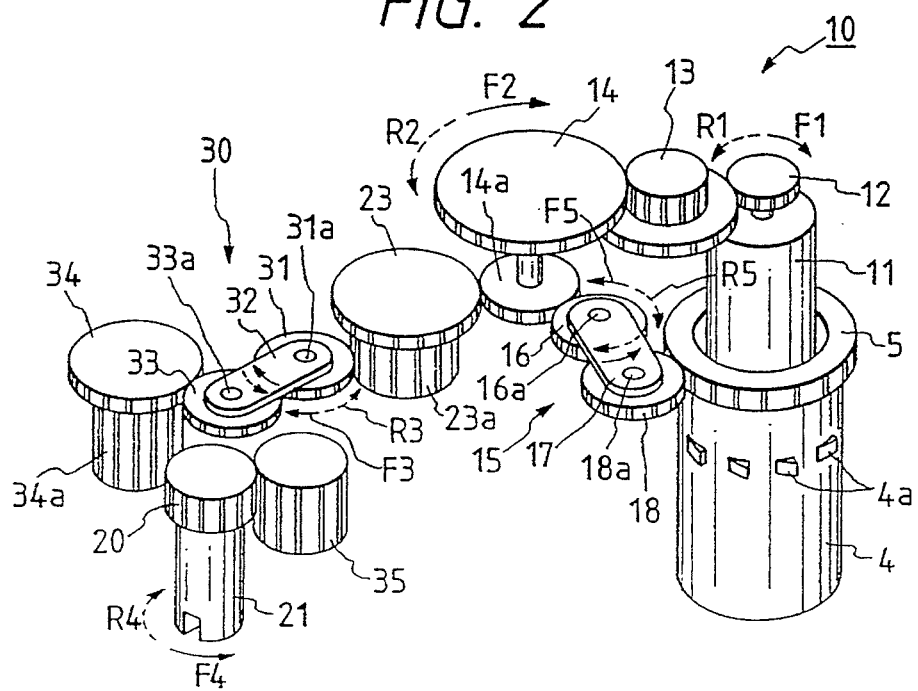

FILM FEEDER FOR CAMERAS

This is a continuation of application Ser. No. 08/226,120 filed Apr. 11, 1994, which is a continuation of application Ser. No. 08/133,797 filed Oct. 8, 1993, which is a continuation of application Ser. No. 07/678,216 filed Apr. 1, 1991, all abandoned.

BACKGROUND OF THE INVENTION

1. Field of the Invention

The present invention relates to a film feeder for still cameras loaded with a film cartridge in which a spool shaft of the cartridge is turned in the forward direction or in the reverse direction, to feed a roll film through a lead-out opening to the outside or rewind it.

2. Related Background Art

For example, U.S. Pat. Nos. 4,832,275 and 4,834,306 disclose a structure of a film cartridge which includes a cylindrical portion having therein a spool shaft for storing a photographic roll film, and a film lead-out portion extending in the tangential direction of and integrally provided with the cylindrical portion and for accommodating the leading edge of the film in a linear state. This type of film cartridge is different in structure from a 135 type film cartridge which is generally used at present. The above-mentioned film cartridge is so constructed that it is specially handled when it is first loaded in a camera, since the leading edge of the film is accommodated in the foregoing lead-out portion so as not to be exposed to light. When the film cartridge is loaded in the camera, the spool shaft is rotated by a drive system of the camera, to consequently send out the leading edge of the film through a lead-out opening of the cartridge.

When the cartridge having such structure is taken out of the camera after rewinding the film upon the completion of photographing, the leading edge of the film remains in the cartridge. In addition, the delivery of the film loaded in the camera can be automatically performed by rotationally driving the spool with the aid of an electric motor, and accordingly, the film can be readily loaded into the camera, which results in an easier handling of the film for the operator.

Nevertheless, in a camera in which a film cartridge having above-mentioned structure is to be loaded, the existing film feeder manufactured for a 135 type film cartridge is incapable of being used, because the film needs to be led out and rewound by rotationally driving the spool of the cartridge.

Suitable camera structures and an internal mechanism thereof capable of loading this type of film cartridge, for example, a mechanism that can be used to send the film out of the cartridge, wind up the film by one frame, and rewind the film into the cartridge, have not been satisfactorily developed. Therefore, the development of a camera having a film lead-out mechanism, a wind-up mechanism, and a rewinding mechanism which will realize the advantages of the above-mentioned structure of the cartridge, is strongly desired.

What is desired with regard to the constitution of such camera, is that the film lead-out, wind-up, rewind operation and the like mentioned above can be executed by a film drive mechanism having a simple structure composed of the minimum number of constituent parts as needed; the working parts are efficiently arranged and the entire device has a small and compact configuration; and the working parts can be stably and reliably operated. Any measures which completely satisfy such requirements need to be adopted.

By way of example, one of the requirements for the constitution of the film feeder for such cameras is to suitably and reliably control the operation of the film lead-out from the film cartridge and the operation of the film rewind into it, through a single drive source and a rotation transmission system driven from the source.

SUMMARY OF THE INVENTION

The present invention was accomplished in view of such needs, and aims to provide a film feeding device in which the above-mentioned cartridge is loaded to ensure a suitable and reliable film lead-out operation as well as a simple film rewinding operation.

A film feeding device for cameras in accordance with the present invention comprises a drive shaft for driving a film cartridge which drive shaft is engaged with a spool shaft of the film cartridge to rotationally drive the spool in the forward direction and the reverse direction, thereby rotationally driving the spool in the film lead-out feeding direction and in the film rewinding direction, respectively; an electric motor for rotationally driving the foregoing drive shaft and capable of rotating forwardly and reversely; a rotation transmission system for transmitting rotation from the motor; and switch transmission means for selecting either of two transmission paths for the drive shaft of the cartridge in compliance with the rotational direction of the foregoing motor.

According to the present invention, a rotational driving force transmitted from an electric motor through a rotation transmission system, is transmitted to a drive shaft of a cartridge by selecting either of two transmission paths through switch means which is changed over in compliance with the rotational direction of the motor, whereby the spool shaft of the cartridge allows the film to be delivered (fed) from the cartridge and rewound into it appropriately and with certainty as the occasion demands.

BRIEF DESCRIPTION OF THE DRAWINGS

FIG. 1 is a schematic perspective view of the essential constitution showing an embodiment of a film feeding device for a camera in accordance with the present invention; and FIG. 2 is a schematic perspective view showing another embodiment of the present invention.

DETAILED DESCRIPTIONS OF THE PREFERRED EMBODIMENTS

Embodiments of the present invention will be described in detail with reference to the accompanying drawings.

Referring now to FIG. 1, which shows an embodiment of the present invention, the reference numeral 1 denotes a film cartridge consisting of a cylindrical portion 1a having a spool shaft 3 therethrough on which a photographic film 2 is wound into a roll, and a film lead-out portion 1b extending in the tangential direction of the foregoing cylindrical portion 1a and provided integrally with it for accommodating the leading edge of the film 2 in a linear state. The film cartridge 1 causes the spool shaft 3 provided therein through the cylindrical portion 1a to be rotated in the lead-out direction (the direction shown by a solid line arrow F4 in the figure) of the film 2 with the aid of a shaft end (e.g., a spline portion), thereby delivering the leading edge of the film 2 through an opening located at the forefront of the lead-out portion 1b. While on the contrary, the rotation of the spool shaft 3 in the rewinding direction (the direction shown by a broken line arrow R4 in the figure) allows the film 2 to be rewound and the leading edge thereof to be withdrawn inside the lead-out portion 1b. In the figure, the reference numeral 2a denotes perforations for auto-loading which are provided in the vicinity of the leading edge of the film 2, and the numeral 2b represents a perforation for identifying a frame position which is provided facing each photographic picture (photographic frame) of the film 2.

The the camera has at one side thereof a cartridge chamber (not shown) for receiving the above-mentioned cartridge, and at the other side opposite to the cartridge chamber a take-up spool 4. The take-up spool 4 winds the film 2, with its leading edge ahead, which is delivered from the cartridge 1 through an aperture for determining a picture plane to be photographed, and then takes up the film 2 frame-by-frame. The take-up spool 4 has at its outer periphery ratchet pawls 4a catching the perforations 2a for auto-loading. At the upper end of the take-up spool 4, there is provided a drive gear 5 which is adapted to receive a rotational torque transmitted from an electric motor 11 which is a drive source for the film feeding device 10 as will be described later. The present embodiment shows a case where the motor 11 is placed within the spool 4.

A photosensor 6 is provided at the camera side facing the position where perforations 2b for identifying the position corresponding to the picture frame to be photographed of the foregoing film 2 can be detected. This sensor controls the delivery or feeding of the film 2.

The film feeding device 10 transmits a rotational drive force from the electric motor 11 disposed inside the take-up spool 4, to the spool shaft 3 of the cartridge 1 and the take-up spool 4, thereby forcing the film to be sent out, wound up, or rewound.

The film feeding device 10 has transmission gears 13, 14, and 14a which are driven from the pinion 12 on the motor shaft. The gear 14a is engaged with a sun gear 16 of an epicyclic gear mechanism 15, which is a transmission switch means for selectively transmitting rotation to the gear 5 on the take-up spool 4 side of the camera. The sun gear 16 is rotatably supported around a fixed sun shaft 16a. Between the sun gear 16 and a lever arm 17 coaxially supported with the sun gear 16, there is interposed a friction spring (not shown) for imparting a friction behavior, thereby enabling the lever arm 17 to swingably move in the rotational direction of the sun gear 16. A planet gear 18 pivotally mounted at the nose of the lever 17 through a pivot 18a, is engaged with the sun gear 16. When the motor 11 is rotated in the direction shown by the arrow F1 in the figure, the sun gear 16 is caused to rotate in the direction shown by the arrow F5 in the figure. As a result, the planet gear 18 is allowed to swing in the counter-clockwise direction in the figure (the direction of the arrow shown by a solid line in the figure) through the lever arm 17, to consequently engage the gear 5 of the take-up spool 4 as illustrated. When the motor 11 is driven to rotate in the direction shown by the arrow R1 in the figure, the planet gear 18 is caused to swing in the clockwise direction in the figure (the direction of the arrow shown by a broken line in the figure), thus being disengaged from the gear 5 of the take-up spool 4.

A key (not shown) provided at the end of the spool shaft 3 of the above-mentioned cartridge 1 is engaged with a fork (not shown) of a drive shaft 21 provided on the camera at the cartridge chamber side for driving the cartridge 1, thereby transmitting the rotational force of the motor. This drive shaft 21 engages the spool shaft 3 when the cartridge 1 is loaded into the camera. The spool shaft 3 is provided with a drive gear 20 (20a and 20b) which is driven for the gear 14a through an epicyclic gearing 25, which is a switch means having a sun gear 24 engaging rotation transmission gear 23a which is in turn in engaged relationship with the gear 14a through gears 22 and 23, thus enabling the rotational force to be selectively transmitted.

A film feeding device 10 having a constitution described above in accordance with the present invention, comprises the drive shaft 21 for driving the cartridge 1 and which is engaged with the spool shaft 3 of the cartridge 1 to rotatably drive the shaft 3 in the forward or reverse direction, thereby rotationally driving the the spool shaft 3 in the lead-out direction of the film 2 or in the rewinding direction thereof, respectively; the electric motor 11 for rotationally driving the drive shaft 21 and capable of rotating in the forward or reverse direction; a rotation transmission system (composed of a series of gears 12, 13, 14, 22, 23 and the like) for transmitting a rotational force from the motor 11; and an epicyclic gearing 25 having a substantially L-shaped lever 26 and which serves as a switch means for selecting either of two transmission paths for driving the drive shaft 21 in compliance with the direction of the rotation transmitted by the motor 11. Here, the reference numeral 24a in the figure denotes a fixedly mounted shaft for pivotally supporting a sun gear 24, and the reference numerals 27 and 28 denote planet gears provided at noses of the lever 26 through pivots 27a and 28a, respectively, and in constant engagement with the sun gear 24. These planet gears 27 and 28 are selectively engaged with gears 20a and 20b provided on the aforesaid drive shaft 21, whereby either of above-mentioned two paths can be selected. Between the sun gear 24 and the lever 26 which constitute the epicyclic gearing 25, there is a friction spring (not shown) which imparts a rotational behavior through a frictional force in the same manner as described hereinbefore. The aforesaid lever 26 is adapted to be swingably movable in correspondence with the rotational direction of the sun gear 24, that is, the rotational direction of the motor.

According to such constitution, with the aid of the epicyclic gearing 25 serving as switch means, either one of the two transmission paths (depending on combination of engagement between the planet gears 27, 28 and the drive gears 20a, 20b) is selected, whereby the film 2 can be suitable and reliably led out of the cartridge 1 or rewound into it by means of the spool shaft 3 rotatably driven as occasion arises.

In accordance with the constitution described above, the spool shaft 3 and the drive gear 20 provided on the drive shaft 21 for driving the cartridge are interconnected by loading the cartridge 1 into the camera. Next, when the motor 11 is driven to rotate in the direction shown by the arrow F1 in the figure by shutting a back cover (not shown) or by half-pushing a release button (not shown), the gear 14 of the rotational transmission system is caused to rotate in the direction shown by the arrow F2 in the figure, thereby causing the sun gear 24 to be rotated in the direction shown by the arrow F3. Simultaneously, the lever 26 is forced to swing in the direction of the arrow shown by a solid line in the figure, thus causing the one planet gear 27 to be engaged with the drive gear 20a, to consequently rotationally drive the spool shaft 21 of the cartridge in the direction shown by the arrow F4, that is, in the film lead-out direction. While on the contrary, when the motor 11 is rotated in the direction shown by the arrow R1, the gear 14 is forced to rotate in the direction shown by the arrow R2 in the figure, and the sun gear 24 is also caused to rotate in the direction shown by the arrow R3 in the figure. Due to this, the other planet gear 28 of the epicyclic gearing 25 is engaged with the gear 20b provided on the drive shaft 21 by a swing of the lever 26 in the direction shown by the broken line arrow in the figure, and consequently, the spool shaft 3 is rotationally driven in the direction shown by the arrow R4 in the figure, that is, in the film rewinding direction. In these cases, it is apparent that the planet gear 28 or 27 to be disengaged is running idle.

When the film 2 is rotationally driven in the lead-out direction as described above, the forward rotation of the motor 11 (the direction shown by the arrow F1 in the figure) causes the epicyclic gearing side to be drivingly engaged with the gear 5 for driving the spool, through the rotation of the lever arm 17 in the direction shown by the solid line arrow in the figure, thus allowing the spool 4 to be rotated in the film take-up direction.

By the way, the film 2 delivered as explained above passes through a film passage having an aperture forming a picture plane, not shown. When the leading edge of the film reaches the outer periphery of the aforesaid take-up spool 4, the film can be wound thereon successively as the ratchet pawls 4a remain engaged with the perforations 2a. At the time of such film lead-out, the take-up spool 4 and the spool shaft 3 are both rotationally driven by the motor 11 in the same direction. The gear ratio between both the transmission systems is so set that the lead-out rate at which the film 2 is led out from the cartridge 1 is lower than the take-up rate at which the film 2 is taken up onto the take-up spool 4. As a result, when the film 2 starts to be wound onto the spool 4 by the sequential catch engagement of the perforations 2a of the film 2 with the ratchet pawls 4a of the spool 4, the spool shaft 3 of the cartridge 1 is forced to rotate at a higher rate than the rotational rate transmitted by the motor 11 due to the tensile force caused by the spool 4 and acting on the film 2. The drive gear 20 (20a, 20b) provided on the drive shaft 21 is thus caused to rotate faster compared to the planet gear 27 which is rotated by the rotation derived from the motor 11. Accordingly, the gear 20 is rotated in relatively opposite direction with respect to the gear 27, whereby the planet gear 27 is slightly rotated to be disengaged from the aforesaid gear 20a through the lever 26. The rotational transmission is thus cut off in this part. The gear 20 and gear 27 are kept separated from each other during the take-up operation. At this time, the lever 26 is not allowed to turn up to the point where the drive gear 20 is caused to engage the other planet gear 28. When the above-mentioned photosensor 6 or an encoder (not shown) for detecting the amount of film delivery generates a signal corresponding to a predetermined amount of film delivered or fed, the motor 11 is stopped, and the initial take-up operation is completed. Subsequently, each time the film 2 is exposed by a photographing operation, the motor 11 is energized to again rotate in the film lead-out direction (the direction shown by the arrow F1 in the figure), to thereby deliver or feed the film 2 by one frame, and simultaneously a signal is generated from the encoder which detects the amount of the film delivery to stop the motor 11. These procedures are then repeated.

After completion of photographing for all the frames, the motor 11 is driven to rotate in the direction of the arrow shown by a broken line in the figure, which is a reverse direction to that mentioned above, whereby the rotational transmission to the take-up spool 4 is cut off through the epicyclic gearing 15 while the rotational transmission to the cartridge 1 is changed over by the rotation of the lever 26 in the direction of the arrow shown by a broken line in the figure. As a result, the engagement of the gear 20b with the planet gear 28 allows the spool shaft 21 to be rotationally driven in the direction shown by the arrow R4 in the figure, that is, in the film rewinding direction, to consequently rewind the film. It should be noted that during the take-up operation, the gears associated with the take-up spool 4 are so positioned that they are capable of running idle by virtue of the rotation of the epicyclic gearing 15 in the direction shown by the arrow R5 in the figure, consequently causing no problem with regard to the operation.

When the rewinding of the film 2 is completed, the encoder or other device ceases the output of signals, and a detecting signal generated based on this de-energizes the motor 11.

It is evident that the drive of the above-mentioned motor 11 is controlled by an electrical control circuit and the sensor 6 for detecting the state of the film delivery, or the like.

FIG. 2 illustrates another embodiment of the device in accordance with the present invention, in which a cartridge 1 for containing a film 3, a photosensor 6, a take-up spool 4, and a film feeding device for controlling the drive of the spool 4 are substantially the same as those shown in the above-mentioned embodiment. Therefore, the corresponding parts are designated by the same reference numerals, and the detailed description thereof will be omitted.

Referring now to FIG. 2, the principal difference between the present embodiment and the first embodiment resides in an epicyclic gearing 30 which serves as switch transmission means used when the rotation force from the motor 11 is transmitted to the gear 20 provided on the drive shaft 21 provided in a cartridge. A brief description thereof will be given hereinafter. The drive gear 20 provided on the drive shaft 21 is engaged with a small gear 34a of a first transmission gear 34, and a second transmission gear 35, which are located at respective sides of the gear 20. The epicyclic gearing 30 is composed of a planet gear 33 which can be selectively engaged with the two gears 34 and 35, a sun gear 31 which engages gear 23a for receiving the rotational force transmitted from the motor 11, and a lever arm 32 which is moved to swing by the obtained rotational force. The reference numeral 31a denotes a fixedly mounted pivot of the sun gear 31, and the numeral 33a represents a pivot of the planet gear 33 mounted to the nose of the lever arm 32. Between the foregoing lever arm 32 and the sun gear 31 is interposed a friction spring (not shown) which causes the lever arm 32 to swing in the rotational direction of the sun gear 31, thus engaging selectively the planet gear 33 with the gears 34 and 35, which in turn engage the aforesaid drive gear 20. The detailed description thereof will be omitted.

In the device 10 constituted as described above in accordance with the present embodiment, the rotation of the motor 11 in the direction shown by the arrow F1 in the figure, allows the sun gear 31 to be rotationally driven in the direction shown by the arrow F3 in the figure through the transmission gear 23a. As a result, the lever 32 is forced to swing in the direction of the arrow shown by the solid line in the figure, thereby allowing the planet gear 33 to be engaged with the transmission gear 34, to consequently rotationally drive the drive shaft 21 in the direction shown by the arrow F4 in the figure through the small gear 34a and drive gear 20. In this way, the film 2 is delivered from the cartridge 1. While on the contrary, when the motor 11 is rotated in the direction shown by the arrow R1 in the figure, the sun gear 31 rotates in the direction shown by the arrow R3, thereby engaging the planet gear 33 with the transmission gear 35, with the result that the drive shaft 21 is rotationally driven in the direction shown by the arrow R4 in the figure, that is, in the rewinding direction of the film 2.

The disengagement of the transmission gear 34 from the planet gear 33, arising from the fact that the film 2 is taken up onto the take-up spool, and the drive control of the take-up spool 4 are performed as described hereinbefore, and accordingly, the detailed description thereof will be omitted.

According to the device of the present invention having the constitution of the embodiments described above, lead-out of the film 2 from the cartridge 1, wind-up and take-up onto the take-up spool 4, and rewinding into the cartridge 1 can be accomplished appropriately and reliably, despite its simple structure. Moreover, the lead-out operation of the film 2 and the rewinding operation select their respective transmission paths which transmit the rotational force derived from the motor to the drive shaft 21, by virtue of the switch transmission means (epicyclic gearing 25, 30). In consequence, the gear ratio between the motor 11 and the drive shaft 21 used during the film lead-out operation and that used during the film rewinding operation can be set independently of each other, thereby ensuring a broader design freedom. In addition, due to the epicyclic gears 25, 30 used as switch transmission means, even if the drive shaft 21 is rotated faster by the tensile force of the film 2 wound around the spool 4, there arises a race between the epicyclic gearing 27, 28; 33 and the associated gears 20a, 20b; 34, 35, thereby compensating the difference in the rotational velocity therebetween, without providing a further one way clutch, which is quite rational.

The present invention is not limited to the structure of the embodiments described hereinbefore. For instance, in the two embodiments mentioned above, the rotational force transmission is cut off between the motor 11 and the take-up spool 4 during the film rewinding operation. However, the present invention is not limited to this constitution, but may have a constitution in which the spool 4 is rotationally driven so that it can send out the film 2 at a higher rate than the rate at which the spool shaft 3 is driven by drive shaft 21 during the rewinding operation. In this case, the perforations 29 of the film 2 wound onto the spool 4 are disengaged from the ratchet pawls 4a when the rolled film 2 is loosened around the spool 4 to slightly enlarge the diameter of the rolled film, with the result that the spool 4 is running idle relative to the film 2 therearound, without any obstacle to the rewinding operation.

Also, in the above-mentioned embodiments, in order to take up the film, there is provided ratchet pawls 4a on the outer periphery of the take-up spool 4, to thereby catch the perforations 2a for the auto-loading. Otherwise, for example, as disclosed in Japanese Utility Model Publication No. 1-25938, the film 2 may be wound up by a pressure roller as well as the take-up spool 4. Furthermore, the take-up spool 4 may have at its surface a layer made of a friction member for the use of auto-loading.

As described hereinbefore, the film feeding device for a camera in accordance with the present invention comprises, a drive shaft for driving a cartridge, which is engaged with a spool shaft of the film cartridge to rotatably drive the shaft in the forward or reverse direction, thereby rotationally driving the spool shaft in the film lead-out direction or in the rewinding direction thereof, respectively; an electric motor for rotationally driving the drive shaft and capable of rotating in the forward or reverse direction; a rotation transmission system for transmitting a rotational force derived from the motor; and switch transmission means for selecting either of two transmission paths for the drive shaft in compliance with the direction of the rotational movement transmitted by the motor. Accordingly, despite the simple constitution of the invention, the spool shaft is capable of obtaining a rotational drive force directed in a predetermined direction, thus achieving a suitable and reliable film lead-out operation from the cartridge and rewinding operation into it.

In particular, according to the present invention, the film lead-out operation and the rewinding operation select their respective transmission paths which transmit the rotational force derived from the motor to the drive shaft, by virtue of the switch transmission means (epicyclic gearing). In consequence, the gear ratio between the motor and the drive shaft used during the film lead-out operation and that used during the film rewinding operation can be set independently of each other, thereby ensuring a broader design freedom. In addition, due to the epicyclic gearing used as a switch transmission means, if the drive shaft is rotated faster by the tensile force of the film wound around the spool, there arises a race between the epicyclic gearing and the associated gears, thereby compensating the difference in the rotational velocity therebetween, without providing a further one way clutch, which is quite rational.

I claim:

1. A film feeding device for a camera to be loaded with a film cartridge having a spool which is rotated forwardly to pay out a leading edge of the film from the cartridge and which is rotated reversely to rewind the film into the cartridge, comprising:

a take-up spool which is rotated forwardly for winding the film paid out from the cartridge about an outer periphery of the take-up spool;

a motor which is rotatable forwardly and reversely;

a drive shaft which is engageable with the cartridge spool and is rotatable forwardly and reversely to rotate the cartridge spool forwardly and reversely, respectively; and rotation transmitting means having a first rotation transmitting path for rotating said drive shaft and said cartridge spool forwardly and a second rotation transmitting path for rotating said drive shaft and said cartridge spool reversely, said rotation transmitting means including epicyclic gearing means in said rotation transmitting paths and constructed so that when said motor rotates forwardly, the rotation thereof is transmitted to said drive shaft and said cartridge spool through said first rotation transmitting path, and when said motor rotates reversely, the rotation thereof is transmitted to said drive shaft and said cartridge spool through said second rotation transmitting path, wherein said drive shaft is also rotatable forwardly by rotation of the cartridge spool through the film in response to winding of the film about the outer periphery of the take-up spool; and wherein rotation speed of said drive shaft rotated forwardly through said first rotation transmitting path is smaller than rotation speed of said drive shaft rotated forwardly rotation of the cartridge spool through the film, said epicyclic gearing means being responsive to the difference in rotation speed of said drive shaft rotated forwardly through said first rotation transmitting path and the rotation speed of said drive shaft rotated forwardly by the cartridge spool to compensate for the difference in rotation speed by interrupting said first rotation transmitting path.

2. A device according to claim 1, wherein said first and second rotation transmitting paths include gear trains having different gear ratios.

3. A device according to claim 1, wherein said rotation transmitting means has a third rotation transmitting path for transmitting the forward rotation of said motor to said film take-up spool.

4. A film feeding device for a camera to be loaded with a film cartridge having a spool which is rotated forwardly to pay out a leading edge of the film from the cartridge and which is rotated reversely to rewind the film into the cartridge, comprising:

a take-up spool rotatable for winding the film paid out from the cartridge about an outer periphery of the take-up spool;

a motor which is rotatable;

a drive shaft which is engageable with the cartridge spool and is rotatable forwardly and reversely to rotate the cartridge spool forwardly and reversely, respectively; and rotation transmitting means having a rotation transmitting path for rotating said drive shaft forwardly to rotate the cartridge spool forwardly, said rotation transmitting means including epicyclic gearing means in said rotation transmitting path constructed so that when said motor rotates, the rotation thereof is transmitted to said drive shaft through said rotation transmitting path to rotate the cartridge spool forwardly, said drive shaft also being rotatable forwardly by rotation of the cartridge spool through the film in response to winding of the film about the outer periphery of the take-up spool, rotation speed of said drive shaft rotated forwardly through said rotation transmitting path being smaller than rotation speed of said drive shaft rotated forwardly by said cartridge spool through the film, said epicyclic gearing means being responsive to the difference in rotation speed of said drive shaft rotated forwardly through said rotation transmitting path and the rotation speed of said drive shaft rotated forwardly by the cartridge spool to compensate for the difference in rotation speed by interrupting said rotation transmitting path.

5. A film feeding method for a camera to be loaded with a film cartridge having a cartridge spool which is rotated forwardly to pay out a leading edge of the film from the cartridge and which is rotated reversely to rewind the film into the cartridge, comprising:

rotating said cartridge spool forwardly to pay out said film from said cartridge by a forward rotation of a drive shaft which receives a forward rotation force of a reversibly rotatable motor through a first transmitting path of a rotation transmitting mechanism including planetary gearing, and which receives a reverse rotation force of the motor through a second transmitting path of said rotation transmitting mechanism for reverse rotation of said cartridge spool, winding the film paid out from the cartridge about an outer periphery of a take-up spool by forwardly rotating said take-up spool, said drive shaft being forwardly rotated by said cartridge spool rotated by the film wound about the cartridge spool upon winding of the film on the take-up spool;

detecting a difference between a first rotation speed of said drive shaft forwardly rotated through said first transmitting path and a second rotation speed of said drive shaft forwardly rotated by the film wound about the cartridge spool, the second rotation speed being greater than the first rotation speed, and employing said planetary gearing to interrupt said first transmitting path upon detecting the difference in the rotation speed of said drive shaft.

6. A film feeding method for a camera to be loaded with a film cartridge having a cartridge spool which is rotated forwardly to pay out a leading edge of the film from the cartridge and which is rotated reversely to rewind the film into the cartridge, comprising:

rotating said cartridge spool forwardly to pay out said film from said cartridge by a forward rotation of a drive shaft which receives a rotation force of a motor through a transmitting path of a rotation transmitting mechanism including planetary gearing;

winding the film paid out from the cartridge about an outer periphery of a take-up spool by forwardly rotating said take-up spool, said drive shaft being forwardly rotated by said cartridge spool rotated by the film wound about the cartridge spool upon winding of the film on the take-up spool;

detecting a difference between a first rotation speed of said drive shaft forwardly rotated through said transmitting path and a second rotation speed of said drive shaft forwardly rotated by the film wound about the cartridge spool, the second rotation speed being greater than the first rotation speed; and employing said planetary gearing to interrupt said transmitting path upon detecting the difference in the rotation speed of said drive shaft.

7. A film feeding device for a film cartridge having a spool which is rotated forwardly to pay out a leading edge of the film from the cartridge and which is rotated reversely to rewind the film into the cartridge, comprising:

a take-up spool which is rotated forwardly for winding the film paid out from the cartridge about an outer periphery of the take-up spool;

a motor which is rotatable forwardly and reversely;

a drive shaft which is engageable with the cartridge spool and is rotatable forwardly and reversely to rotate the cartridge spool forwardly and reversely, respectively; and a rotation transmitting mechanism having a first rotation transmitting path for rotating said drive shaft and said cartridge spool forwardly and a second rotation transmitting path for rotating said drive shaft and said cartridge spool reversely, said rotation transmitting mechanism including epicyclic gearing in said rotation transmitting paths and constructed so that when said motor rotates forwardly, the rotation thereof is transmitted to said drive shaft and said cartridge spool through said first rotation transmitting path, and when said motor rotates reversely, the rotation thereof is transmitted to said drive shaft and said cartridge spool through said second rotation transmitting path, wherein said drive shaft is also rotatable forwardly by rotation of the cartridge spool through the film in response to winding of the film about the outer periphery of the take-up spool; and wherein rotation speed of said drive shaft rotated forwardly through said first rotation transmitting path is smaller than rotation speed of said drive shaft rotated forwardly by rotation of the cartridge spool through the film, said epicyclic gearing being responsive to the difference in rotation speed of said drive shaft rotated forwardly through said first rotation transmitting path and the rotation speed of said drive shaft rotated forwardly by the cartridge spool to compensate for the difference in rotation speed by interrupting said first rotation transmitting path.

8. A film feeding device for a film cartridge having a spool which is rotated forwardly to pay out a leading edge of the film from the cartridge and which is rotated reversely to rewind the film into the cartridge, comprising:

a take-up spool rotatable for winding the film paid out from the cartridge about an outer periphery of the take-up spool;

a motor which is rotatable;

a drive shaft which is engageable with the cartridge spool and is rotatable forwardly and reversely to rotate the cartridge spool forwardly and reversely, respectively; and a rotation transmitting mechanism having a rotation transmitting path for rotating said drive shaft forwardly to rotate the cartridge spool forwardly, said rotation transmitting mechanism including epicyclic gearing in said rotation transmitting path constructed so that when said motor rotates, the rotation thereof is transmitted to said drive shaft through said rotation transmitting path to rotate the cartridge spool forwardly, said drive shaft also being rotatable forwardly by rotation of the cartridge spool through the film in response to winding of the film about the outer periphery of the take-up spool, rotation speed of said drive shaft rotated forwardly through said rotation transmitting path being smaller than rotation speed of said drive shaft rotated forwardly by said cartridge spool through the film, said epicyclic gearing being responsive to the difference in rotation speed of said drive shaft rotated forwardly through said rotation transmitting path and the rotation speed of said drive shaft rotated forwardly by the cartridge spool to compensate for the difference in rotation speed by interrupting said rotation transmitting path.

9. A film feeding method for a film cartridge having a cartridge spool which is rotated forwardly to pay out a leading edge of the film from the cartridge and which is rotated reversely to rewind the film into the cartridge, comprising:

rotating said cartridge spool forwardly to pay out said film from said cartridge by a forward rotation of a drive shaft which receives a forward rotation force of a reversibly rotatable motor through a first transmitting path of a rotation transmitting mechanism including planetary gearing, and which receives a reverse rotation force of the motor through a second transmitting path of said rotation transmitting mechanism for reverse rotation of said cartridge spool;

winding the film paid out from the cartridge about an outer periphery of a take-up spool by forwardly rotating said take-up spool, said drive shaft being forwardly rotated by said cartridge spool rotated by the film wound about the cartridge spool upon winding of the film on the take-up spool;

detecting a difference between a first rotation speed of said drive shaft forwardly rotated through said first transmitting path and a second rotation speed of said drive shaft forwardly rotated by the film wound about the cartridge spool, the second rotation speed being greater than the first rotation speed, and employing said planetary gearing to interrupt said first transmitting path upon detecting the difference in the rotation speed of said drive shaft.

10. A film feeding method for a film cartridge having a cartridge spool which is rotated forwardly to pay out a leading edge of the film from the cartridge and which is rotated reversely to rewind the film into the cartridge, comprising:

rotating said cartridge spool forwardly to pay out said film from said cartridge by a forward rotation of a drive shaft which receives a rotation force of a motor through a transmitting path of a rotation transmitting mechanism including planetary gearing;

winding the film paid out from the cartridge about an outer periphery of a take-up spool by forwardly rotating said take-up spool, said drive shaft being forwardly rotated by said cartridge spool rotated by the film wound about the cartridge spool upon winding of the film on the take-up spool;

detecting a difference between a first rotation speed of said drive shaft forwardly rotated through said transmitting path and a second rotation speed of said drive shaft forwardly rotated by the film wound about the cartridge spool, the second rotation speed being greater than the first rotation speed; and employing said planetary gearing to interrupt said transmitting path upon detecting the difference in the rotation speed of said drive shaft.

* * * * *